US 6,733,661 B2

(12) United States Patent
Mukogawa et al.

(10) Patent No.: US 6,733,661 B2
(45) Date of Patent: May 11, 2004

(54) ULTRAPURE WATER PRODUCING APPARATUS

(75) Inventors: Yasukazu Mukogawa, Tokyo (JP); Masaharu Hama, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/930,132

(22) Filed: Aug. 16, 2001

(65) Prior Publication Data
US 2002/0134722 A1 Sep. 26, 2002

(30) Foreign Application Priority Data
Mar. 26, 2001 (JP) ........................................ 2001-086614

(51) Int. Cl.⁷ ................................................ C02F 9/00
(52) U.S. Cl. ........................ 210/93; 210/96.2; 210/259; 210/266; 210/284; 210/900
(58) Field of Search ..................... 210/93, 96.1, 96.2, 210/202, 259, 266, 284, 900

(56) References Cited

U.S. PATENT DOCUMENTS

| 3,870,033 A | * | 3/1975 | Faylor et al. | 210/900 |
| 4,101,296 A | * | 7/1978 | Lowther | 55/33 |
| 4,383,920 A | * | 5/1983 | Muller et al. | 210/284 |
| 5,073,268 A | * | 12/1991 | Saito et al. | 210/900 |
| 5,259,972 A | * | 11/1993 | Miyamaru et al. | 210/900 |
| 5,512,178 A | * | 4/1996 | Dempo | 210/900 |
| 5,571,419 A | * | 11/1996 | Obata et al. | 210/900 |
| 6,177,005 B1 | * | 1/2001 | Yamasaki et al. | 210/900 |
| 6,375,851 B1 | * | 4/2002 | Sterling et al. | 210/677 |

FOREIGN PATENT DOCUMENTS

| JP | 9-29251 | 2/1997 |
| JP | 10-123118 | 5/1998 |
| JP | 11-57752 | 3/1999 |
| WO | WO 97/30939 | 8/1997 |

* cited by examiner

Primary Examiner—Ivars C. Cintins
(74) Attorney, Agent, or Firm—Oblon, Spivak, McClelland, Maier & Neustadt, P.C.

(57) ABSTRACT

It is an object of the present invention to provide an ultrapure water producing apparatus with reduced problems resulting from impurities generated after replacement of unit apparatuses.

A TOC-UV (1), a CP (2) and a UF film (3) are provided in this order from the upstream side of a pure water supply route. Ultrapure water flowing through the UF film (3) is supplied to a use point. A branch route branched from the pure water supply route is provided downstream of the UF film (3). A dissolved oxygen concentration meter (M1) is interposed in the branch route for measuring dissolved oxygen concentration in ultrapure water passed through the UF film (3). The branch route is connected to an oxidant decomposition unit (11). Oxidants included in ultrapure water flowing through the branch route are all converted into DO at the oxidant decomposition unit (11).

4 Claims, 9 Drawing Sheets

| RELATIVE STRENGTH OF UV LAMP POWER | DO (ppt) | TOC (ppt) |
|---|---|---|
| 1.0 | 6400 | 2000 |
| 0.67 | 4900 | 3000 |

ULTRAPURE WATER PRODUCING APPARATUS

BACKGROUND OF THE INVENTION

1. Field of the Invention

The present invention relates to an ultrapure water producing apparatus, and more particularly to an ultrapure water producing apparatus having a replaceable unit apparatus.

2. Description of the Background Art

In an industry where ultrapure water is used such as the semiconductor industry or the medical industry, it is becoming necessary to remove impurities at the level of ppt (parts per trillion) to ppq (parts per quadrillion). For removal of impurities at this level, there are introduced unit apparatuses such as an ultraviolet oxidation unit with low pressure mercury lamp, an ion exchange resin and ultrafiltration equipment.

Since such unit apparatuses are consumable products, they need to be replaced at regular time intervals, however, elution of impurities from these unit apparatuses is detected just after the replacement. This eluted component is not acceptable for impurity control at the level of ppt to ppq. However, it is in fact extremely difficult to reduce the eluted component to zero.

SUMMARY OF THE INVENTION

A first aspect of the present invention is directed to an ultrapure water producing apparatus. The ultrapure water producing apparatus comprises: an ultraviolet oxidation unit and an ion exchanger provided in this order from the upstream side of a direction in which pure water flows; an oxidant decomposition unit for sampling pure water already undergone ion exchange in the ion exchanger, thereby decomposing all of oxidants included in sampled pure water into dissolved oxygen; and a feedback system for measuring a first dissolved oxygen concentration in the pure water already undergone ion exchange and a second dissolved oxygen concentration in pure water already decomposed in the oxidant decomposition unit to calculate a third dissolved oxygen concentration indicating a difference between the first and second oxygen concentrations, thereby adjusting the amount of ultraviolet light of the ultraviolet oxidation unit based on the third dissolved oxygen concentration.

According to a second aspect of the present invention, in the ultrapure water producing apparatus of the first aspect, the feedback system includes: a first dissolved oxygen concentration meter for detecting the first dissolved oxygen concentration; a second dissolved oxygen concentration meter for detecting the second dissolved oxygen concentration; and a control system for calculating the third dissolved oxygen concentration upon receipt of data from the first and second dissolved oxygen concentration meters and controlling the amount of ultraviolet light of the ultraviolet oxidation unit.

According to a third aspect of the present invention, in the ultrapure water producing apparatus of the first aspect, the oxidant decomposition unit includes a system for alkalizing the sampled pure water already undergone ion exchange by introducing an alkali component.

According to a fourth aspect of the present invention, in the ultrapure water producing apparatus of the first aspect, the oxidant decomposition unit includes a system for bringing the sampled pure water already undergone ion exchange into contact with platinum or activated carbon.

A fifth aspect of the present invention, an ultrapure water producing apparatus includes: at least two ion exchangers provided in series; a main route provided to flow pure water in the order that the at least two ion exchangers are provided; and a plurality of bypass routes connected to the main route for flowing pure water in the order different from that in which the at least two ion exchangers are provided.

According to a sixth aspect of the present invention, in the ultrapure water producing apparatus of the fifth aspect, the at least two ion exchangers at least include: a first ion exchanger provided on the uppermost stream side; and a second ion exchanger other than the first ion exchanger, discharging first processed pure water, the plurality of bypass routes include a first bypass route, a second bypass route and a third bypass route, the first bypass route supplying the first processed pure water to the at least two ion exchangers except the second ion exchanger discharging the first processed pure water, the second bypass route sending, to the main route, second processed pure water discharged from the at least two ion exchangers except the second ion exchanger which have been supplied with the first processed pure water, and the third bypass route supplying pure water to each of the at least two ion exchangers except the first ion exchanger.

According to a seventh aspect of the present invention, the ultrapure water producing apparatus of the sixth aspect further comprises: an ultrafiltration film provided downstream of the at least two ion exchangers; a fourth bypass route for supplying permeate pure water discharged from the ultrafiltration film to the at least two ion exchangers; and a metal concentration meter for detecting a metal component of the permeate pure water flowing through the fourth bypass route.

According to an eighth aspect of the present invention, in the ultrapure water producing apparatus of the sixth aspect, the main route includes a plurality of main route valves provided on its route for interrupting supply of pure water to the at least two ion exchangers by each one of the at least two ion exchangers, and the plurality of main route valves are closed when flowing pure water through the first to third bypass routes.

A ninth aspect of the present invention is directed to an ultrapure water producing apparatus. The ultrapure water producing apparatus comprises a total organic carbon meter for decomposing an organic substance by applying ultraviolet light to pure water, thereby measuring an organic substance concentration of generated carbon dioxide, wherein the total organic carbon meter includes an oxygen dissolution unit provided on an inlet side of pure water for dissolving oxygen in pure water supplied to the total organic carbon meter.

According to a tenth aspect of the present invention, in the ultrapure water producing apparatus of the ninth aspect, the oxygen dissolution unit includes a system for bubbling, in pure water, oxygen gas or ozone gas not including an organic substance.

According to an eleventh aspect of the present invention, in the ultrapure water producing apparatus of the ninth aspect, the oxygen dissolution unit includes a system for cooling pure water supplied to the total organic carbon meter, thereby supplying cooled pure water with oxygen gas or ozone gas not including an organic substance.

A twelfth aspect of the present invention is directed to an ultrapure water producing apparatus comprising a carbon dioxide dissolution unit provided between an outlet of pure water already undergone final processing and a use point to which pure water is finally supplied, for dissolving carbon dioxide in the pure water already undergone final processing.

According to a thirteenth aspect of the present invention, in the ultrapure water producing apparatus of the twelfth aspect, the carbon dioxide dissolution unit includes a system for bubbling carbon dioxide gas in pure water.

According to a fourteenth aspect of the present invention, in the ultrapure water producing apparatus of the twelfth aspect, the carbon dioxide dissolution unit and the use point are connected by a conductive piping.

In the ultrapure water producing apparatus according to the first aspect, the third dissolved oxygen concentration is a value reflecting the amount of oxidants remaining in the pure water already undergone ion exchange. The use of the remaining amount of oxidants as an index for adjusting the amount of ultraviolet light of the ultraviolet oxidation unit allows more appropriate impurity control compared to a conventional apparatus having no other way but to take only total organic carbon concentration or dissolved oxygen concentration as an index.

In the ultrapure water producing apparatus according to the second aspect, there can be obtained a specific structure of the feedback system for adjusting the amount of ultraviolet light of the ultraviolet oxidation unit.

In the ultrapure water producing apparatus according to the third aspect, the pure water already undergone ion exchange is alkalized to thereby decompose oxidants, which allows the oxidant decomposition unit to have a simple structure.

In the ultrapure water producing apparatus according to the fourth aspect, oxidants are decomposed by the catalytic effect of platinum or activated carbon, which allows the oxidant decomposition unit to have a low running cost.

The ultrapure water producing apparatus according to the fifth aspect comprises at least two ion exchangers provided in series and a plurality of bypass routes for flowing pure water in the order different from that in which the at least two ion exchangers are provided, so that the ion exchangers are replaced one by one. During the period in which a brand-new ion exchanger elutes a metal component, its discharge is given to the remainder of the ion exchangers to remove the metal component, which can prevent pure water including the metal component eluted from the brand-new ion exchanger from being supplied to the use point.

In the ultrapure water producing apparatus according to the sixth aspect, except when one of the ion exchangers provided on the uppermost stream side is replaced, pure water is first supplied to a brand-new ion exchanger through the third bypass route. During the period in which the brand-new ion exchanger elutes a metal component, its discharge is given to the remainder of the ion exchangers to remove the metal component and send it to the main route through the second bypass route, thereby preventing pure water including the metal component eluted from the brand-new ion exchanger from being supplied to the use point.

In the ultrapure water producing apparatus according to the seventh aspect, after replacing an ultrafiltration film, removal of a metal component by supplying the permeate pure water to the at least two ion exchangers through the fourth bypass route is continued until the metal component eluted from the ultrafiltration film reaches a predetermined concentration, which prevents pure water including the metal component eluted from a brand-new ultrafiltration film from being supplied to the use point.

The ultrapure water producing apparatus according to the eighth aspect achieves a specific structure in which it is only after supply of pure water to a brand-new ion exchanger that the remainder of the ion exchangers can be supplied with pure water.

In the ultrapure water producing apparatus according to the ninth aspect, since the total organic carbon meter includes an oxygen dissolution unit for dissolving oxygen in pure water to be measured, an organic substance can be completely decomposed even when there is little oxygen dissolved in pure water, allowing an accurate calculation of organic carbon concentration.

The ultrapure water producing apparatus according to the tenth aspect allows the oxidant decomposition unit to have a relatively simple structure.

The ultrapure water producing apparatus according to the eleventh aspect comprises the system for cooling pure water, which makes it possible to bring pure water into the state in which oxygen gas or ozone gas has an increased solubility. Thus, oxygen gas or ozone gas can be dissolved effectively.

The ultrapure water producing apparatus according to the twelfth aspect comprises the carbon dioxide dissolution unit for dissolving carbon dioxide in pure water already undergone final processing. This can reduce the specific resistance of pure water and make its electrical conductivity good, thereby preventing the piping to the use point from being charged. As a result, this prevents electrically charged particulates from being electrostatically adsorbed on the piping and gathering to form a particle, and prevents sudden desorption of this particle due to variations in pressure or variations in the amount of flow. Therefore, it is possible to reduce particles in pure water.

The ultrapure water producing apparatus according to the thirteenth aspect allows the carbon dioxide dissolution unit to have a relatively simple structure.

In the ultrapure water producing apparatus according to the fourteenth aspect, the carbon dioxide dissolution unit and the use point are connected by the conductive piping, which allows to more effectively prevent the piping from being charged.

An object of the present invention is to provide an ultrapure water producing apparatus with reduced problems resulting from impurities generated after the replacement of unit apparatuses.

These and other objects, features, aspects and advantages of the present invention will become more apparent from the following detailed description of the present invention when taken in conjunction with the accompanying drawings.

DESCRIPTION OF THE PREFERRED EMBODIMENTS

<A. First Preferred Embodiment>

<A-1. Introduction>

Cited as examples of unit apparatuses used for removing impurities in an ultrapure water producing apparatus are an ultraviolet oxidation unit with low pressure mercury lamp (hereinafter may be abbreviated to TOC-UV), ion exchange resin equipment (cartridge polisher: hereinafter may be abbreviated to CP) and ultrafiltration equipment. In many cases, these units are provided in this order from the upstream side of a pure water supply route.

A TOC-UV decomposes an organic molecule existing in pure water into organic acid or carbon dioxide ($CO_2$) using ultraviolet light radiated from an ultraviolet lamp with low pressure, and a CP includes a cylindrical ion exchange resin for removing ions remaining in pure water to the limit and replaces the ion exchange resin together with its cartridge.

Ultrafiltration equipment is pressure filtration equipment for effecting separation according to the size of molecules using an ultrafiltration film (UF film) capable of removing a high polymer, which may be referred to a UF film in the explanation hereinafter.

In recent years, phenomena have been found in which dissolved oxygen (hereinafter may be abbreviated to DO) increases downstream of a CP just after being replaced and in which total organic carbon (hereinafter may be abbreviated to TOC) decreases with an increase in the amount of ultraviolet radiation of a TOC-UV while DO increases.

Figures 1, 2:
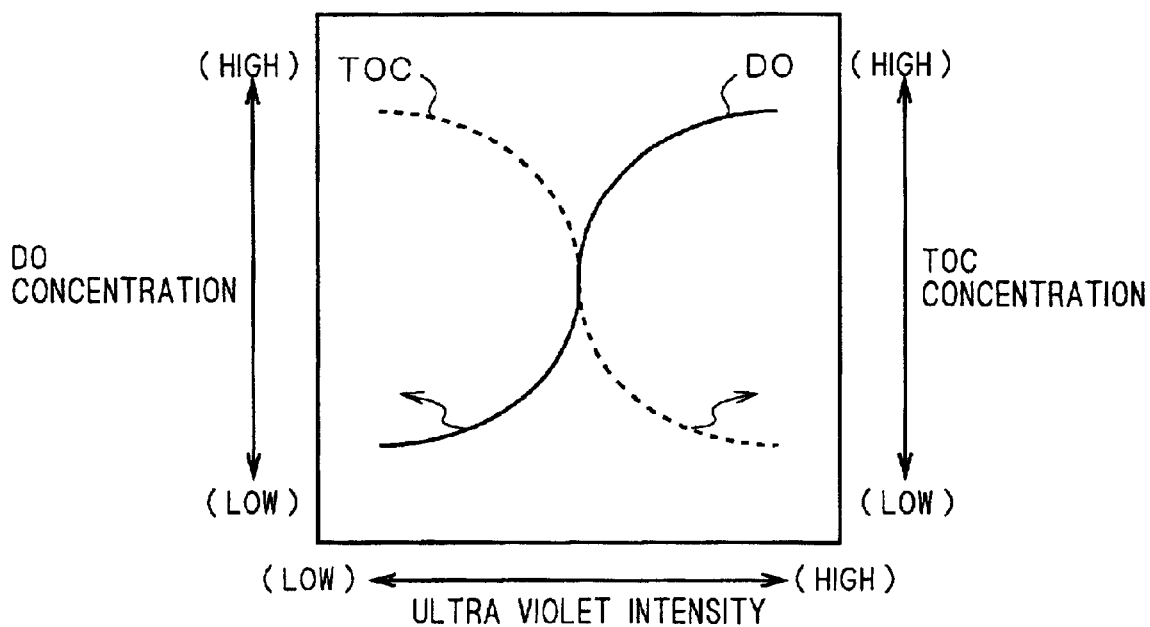
FIG. 1 shows the relationship between the DO concentration and the TOC concentration with respect to the ultraviolet intensity at a TOC-UV.
FIG. 2 shows measured values of the DO concentration and the TOC concentration with respect to the strength of UV lamp power at the TOC-UV.

Thus, FIG. 1 shows the relationship between the DO concentration and the TOC concentration with respect to the ultraviolet intensity at the TOC-UV. In FIG. 1, the horizontal axis indicates the ultraviolet intensity and the vertical axis indicates the DO concentration and the TOC concentration by an arbitrary unit, respectively. The DO concentration is shown by a solid line and the TOC concentration is shown by a broken line.

As shown in FIG. 1, DO increases in the shape of an S while TOC decreases in the shape of a reversed S with an increase in the ultraviolet intensity, which reveals that DO and TOC have the trade-off relationship.

FIG. 2 shows measured values of the DO concentration and the TOC concentration with respect to the strength (relative strength) of UV lamp power at the TOC-UV.

In FIG. 2, there are shown the DO concentration and the TOC concentration measured under two conditions in which the UV lamp power is 1.0 and 0.67, respectively. In the drawing, the DO concentration is 6400 ppt and the TOC concentration is 2000 ppt when the UV lamp power is 1.0, and the DO concentration is 4900 ppt and the TOC concentration is 3000 ppt when the UV lamp power is 0.67. This shows that DO and TOC have the trade-off relationship, although the TOC concentration is lower than the DO concentration in the absolute value.

It is the promotion of dissolution of organic molecules in pure water that causes TOC to decrease with an increase in the ultraviolet intensity. An exemplary mechanism in which DO increases can be explained as follows: radiation of ultraviolet light onto pure water at the TOC-UV causes decomposition of water, and radical oxygen (O.) is generated by the reaction of $H_2O \rightarrow OH.+H.$ and $OH. \rightarrow O. +H.$ As has been described, radical oxygen, hydroxyl, water, $H_2O_2$ (hydrogen peroxide) and the like are generated by the ultraviolet radiation. They are generically referred to as oxidant in the explanation hereinafter. In addition, it is considered that some catalytic component causes these oxidants to be converted to oxygen ($O_2$) when passing through a brand-new CP.

Here, a problem arises in that the generation amount of oxygen decreases with the passage of time. It is preferable in manufacturing of a semiconductor device that pure water have certain constituents. Further, it is preferable that the TOC concentration be low, whereas it is not necessarily preferable that the DO concentration be low. According to some information, it is preferable that DO be included to a certain degree.

However, since the DO concentration and the TOC concentration have the trade-off relationship as described above, reduction of the ultraviolet intensity for reducing the DO concentration causes the TOC concentration to increase. Thus, it does not end in mere reduction of the ultraviolet intensity.

Further, it is conceivable that the DO concentration depends upon the amount of oxidants, and the amount of oxidants increases with an increase in the ultraviolet intensity. Thus, it is important to measure the amount of oxidants in order to control the DO concentration. However, oxidant is a generic term for various types of radical components, $H_2O_2$ and uncertain molecules, which makes it difficult to measure the amount (concentration) of oxidants.

The inventors have conceived not direct, but indirect measurement of oxidants, and have reached the technical idea of controlling the ultraviolet intensity considering the amount of oxidants in addition to the DO concentration and the TOC concentration.

<A-2. Apparatus Structure>

Figure 3:
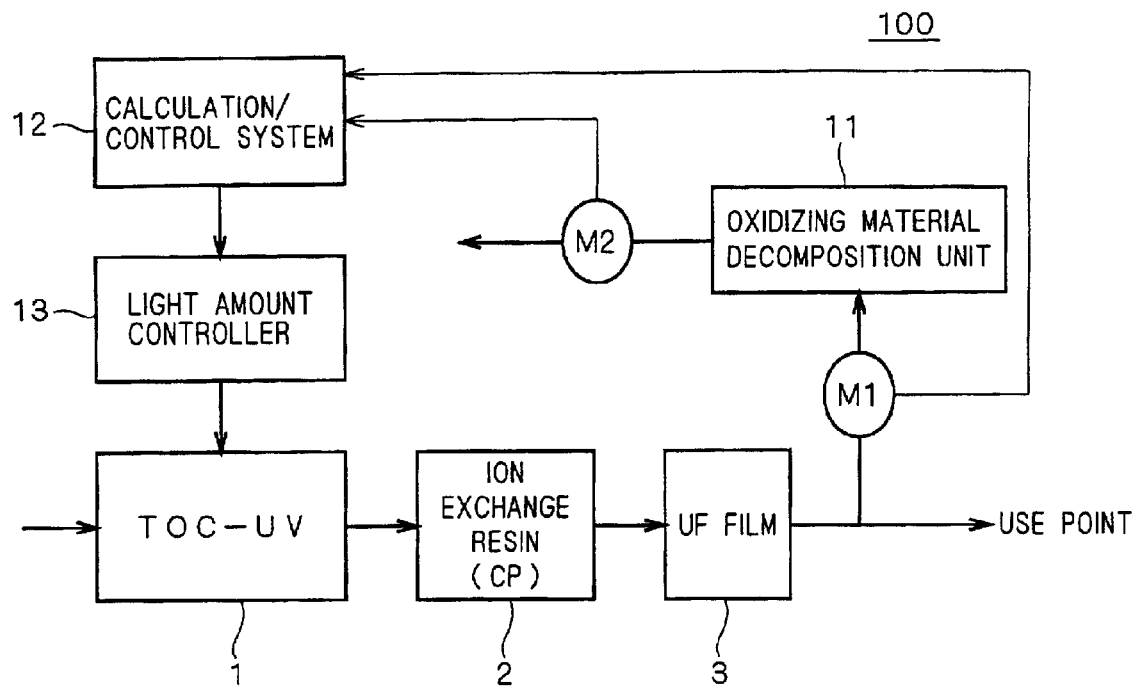
FIG. 3 is a block diagram showing a structure of an ultrapure water producing apparatus according to a first embodiment of the present invention.

FIG. 3 is a block diagram showing a structure of an ultrapure water producing apparatus 100 according to the first embodiment.

As shown in FIG. 3, a TOC-UV (ultraviolet oxidation unit with low pressure mercury lamp) 1, a CP (ion exchange resin) 2 and a UF film (ultrafiltration equipment) 3 are provided in this order from the upstream side of an ultrapure water supply route, and ultrapure water passed through the UF film 3 is supplied to a use point.

A branch route branched from the ultrapure water supply route is provided downstream of the UF film 3, and a dissolved oxygen concentration meter M1 is provided on the branch route for measuring the dissolved oxygen concentration of ultrapure water passed through the UF film 3.

The branch route is connected to an oxidant decomposition unit 11, so that oxidants included in ultrapure water passing through the branch route are all converted into DO in the oxidant decomposition unit 11.

The oxidant decomposition unit 11 converts oxidants into DO by introducing an alkali component or utilizing the catalytic effect of platinum (Pt) or activated carbon.

The method of introducing an alkali component allows to obtain an oxidant decomposition unit having a simple mechanism. On the other hand, the method of utilizing the catalytic effect allows to obtain an oxidant decomposition unit having a low running cost.

Then, the dissolved oxygen concentration of ultrapure water passed through the oxidant decomposition unit 11 is measured by a dissolved oxygen concentration meter M2. Data measured at this time is given to a calculation/control system 12.

Upon receipt of data measured at the dissolved oxygen concentration meters M2 and M1, the calculation/control system 12 has the function of calculating the amount of oxidants remaining after passing through a CP as the DO converted amount by obtaining a difference between the both data.

It is difficult to measure oxidants directly as has been described, however, the inventors have reached the idea that the conversion of oxidants into DO reveals the amount of oxidants, though indirectly as the DO converted amount, since the technique of measuring the DO concentration has been established.

<A-3. Apparatus Operation>

In the present embodiment, measurements are made on a DO concentration DO1 in ultrapure water after passing through the UF film 3, i.e., CP, and a DO concentration DO2 in ultrapure water after passing through the oxidant decomposition unit 11, thereby obtaining a difference between two measured values. Thus, the amount of oxidants remaining after passing through a CP can be obtained as a DO converted amount DO3.

Figure 4:
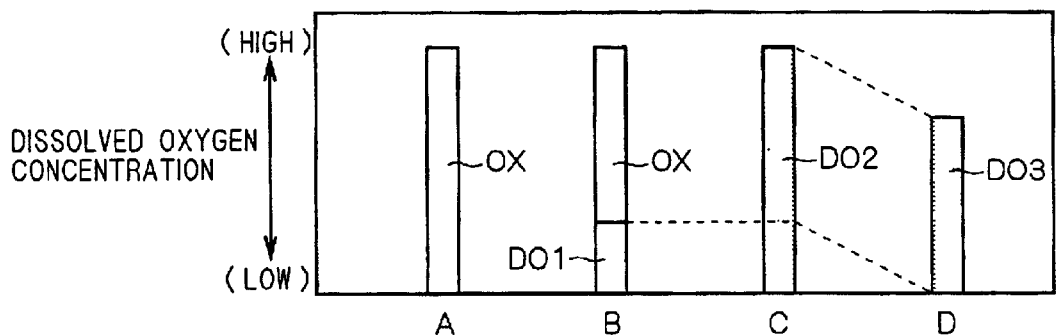
FIG. 4 explains a concept of calculation of the remaining amount of oxidants.

FIG. 4 shows a graphed concept of calculation of the remaining amount of oxidants. In FIG. 4, the vertical axis indicates the dissolved oxygen (DO) concentration by an arbitrary unit. The horizontal axis indicates graphs of measured results at predetermined points in the ultrapure water producing apparatus 100. More specifically, graph A shows data (imaginary value) between the TOC-UV 1 and the CP 2, graph B shows data after passing through the UF film 3, and graph C shows data after passing through the oxidant decomposition unit 11. The graph A only shows oxidants OX considering that oxidants generated in the TOC-UV 1 remain as they are since it is prior to passing through the CP 2. This graph is an imaginary one since it is impossible to directly measure the amount of oxidants. DO originally included in pure water is omitted.

The graph B shows the condition in which part of oxidants is converted into DO by passing through the CP 2. A hatched portion indicates the DO concentration DO1 and the remainder indicates the remaining oxidants OX.

The graph C only shows DO in which oxidants have all completely been converted into DO to be the DO concentration DO2 by passing through the oxidant decomposition unit 11. The graph D shows a difference between the graphs C and B, in which the remaining amount of oxidants is shown as the DO converted amount DO3 obtained by conversion into DO.

<A-4. Effect>

The remaining amount of oxidants obtained as has been described is used to control a light amount controller 13 for controlling the amount of UV light of the TOC-UV 1. For instance, when the CP 2 is brand-new with a high DO concentration, the amount of UV light is reduced by reducing the remaining amount of oxidants so that the total amount of oxidants is reduced, and when the generation amount of DO at the CP2 is reduced with time, the remaining amount of oxidants is increased to increase the amount of UV light so that the total amount of oxidants increases. Control is thus made to keep the DO concentration constant.

At this time, considering the TOC concentration as well, it is preferable to control the TOC concentration not to be excessively high in accordance with a reduction of the amount of UV light.

In controlling the amount of UV light, not only the aforementioned remaining amount of oxidants (i.e., DO converted amount DO3), but also a ratio between the remaining amount of oxidants DO3 and the DO concentration DO1 in ultrapure water after passing through a CP may be used as an index, as a matter of course.

In this way, not only the TOC concentration and the DO concentration but also the remaining amount of oxidants is used as an index for controlling the amount of UV light of the TOC-UV 1, which allows more appropriate control of impurities.

<B. Second Preferred Embodiment>

The above-described first embodiment refers to controlling an increase of dissolved oxygen (DO) just after the replacement of an ion exchange resin (CP), however, just after the replacement of a CP or ultrafiltration equipment (UF film), a metal component at the ppt level which seems to have been eluted therefrom may be detected in some cases.

In the present embodiment, explanation will be given on a structure of an ultrapure water producing apparatus 200 capable of reducing a metal component in ultrapure water just after the replacement of a CP or ultrafiltration equipment.

Figure 5:
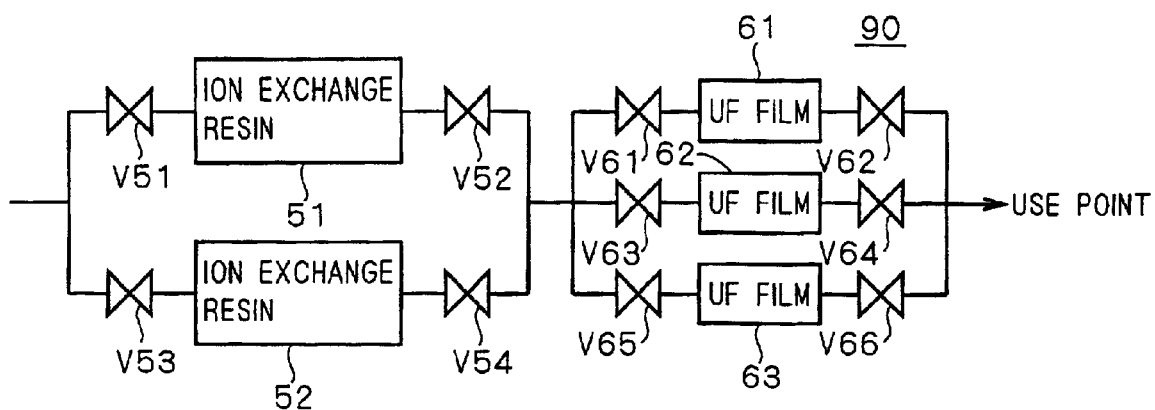
FIG. 5 shows a structure of a conventional ultrapure water producing apparatus including a plurality of CPs and a plurality of UF films.

FIG. 5 shows a structure of a conventional ultrapure water producing apparatus 90 including a plurality of CPs and a plurality of UF films.

In FIG. 5, the ultrapure water producing apparatus 90 has CPs 51 and 52 connected in parallel to an ultrapure water supply route. The CPs 51 and 52 can be detached individually by means of valves V51 and V52, and valves V53 and V54, respectively.

Further provided downstream of the CPs 51 and 52 are UF films 61, 62 and 63 connected in parallel to the ultrapure water supply route. The UF films 61 to 63 can be detached individually by means of valves V61 and V62, valves V63 and V64, and valves V65 and V66, respectively.

Figure 6:
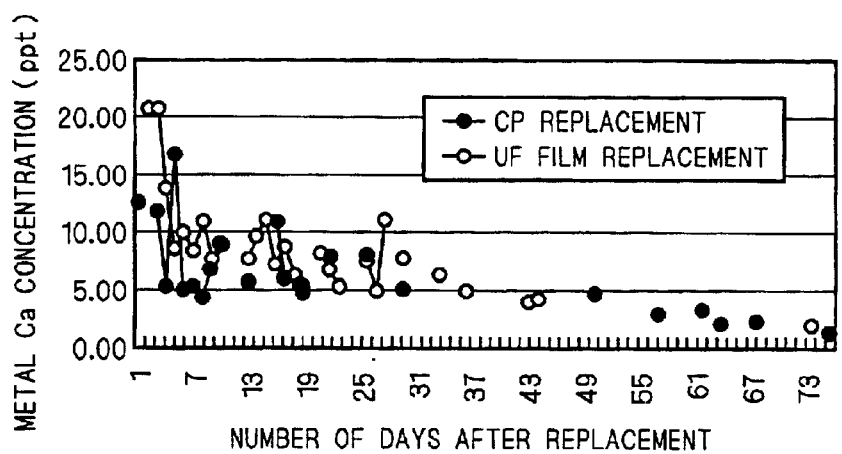
FIG. 6 shows the case of metal elution from CPs and UF films.

FIG. 6 shows the case of metal elution when the CPs 51 and 52 and UF films 61 to 63 are replaced in the ultrapure water producing apparatus 90 structured in the above manner.

In FIG. 6, the horizontal axis indicates the number of days after replacement, and the vertical axis indicates a metal Ca (Calcium) concentration in the unit ppt. The change in the metal Ca concentration over days in the case of CP replacement is shown by black circle, and the change in the metal Ca concentration over days in the case of UF film replacement is shown by white circle.

As shown in FIG. 6, in the both cases of CP replacement and UF film replacement, the concentration is in the highest state for a few days immediately after the replacement. Though varying, metal Ca of relatively high concentration (not less than 5 ppt) is detected until almost 37 days have passed. Thereafter, the concentration becomes 5 ppt or less, which reveals that the concentration decreases with the passage of days.

The CP replacement or UF film replacement causes metal elution as has been described, however, any measures against such metal elution have not been taken in the conventional ultrapure water producing apparatus 90 as shown in FIG. 5.

<B-1. Apparatus Structure>

Figure 7:
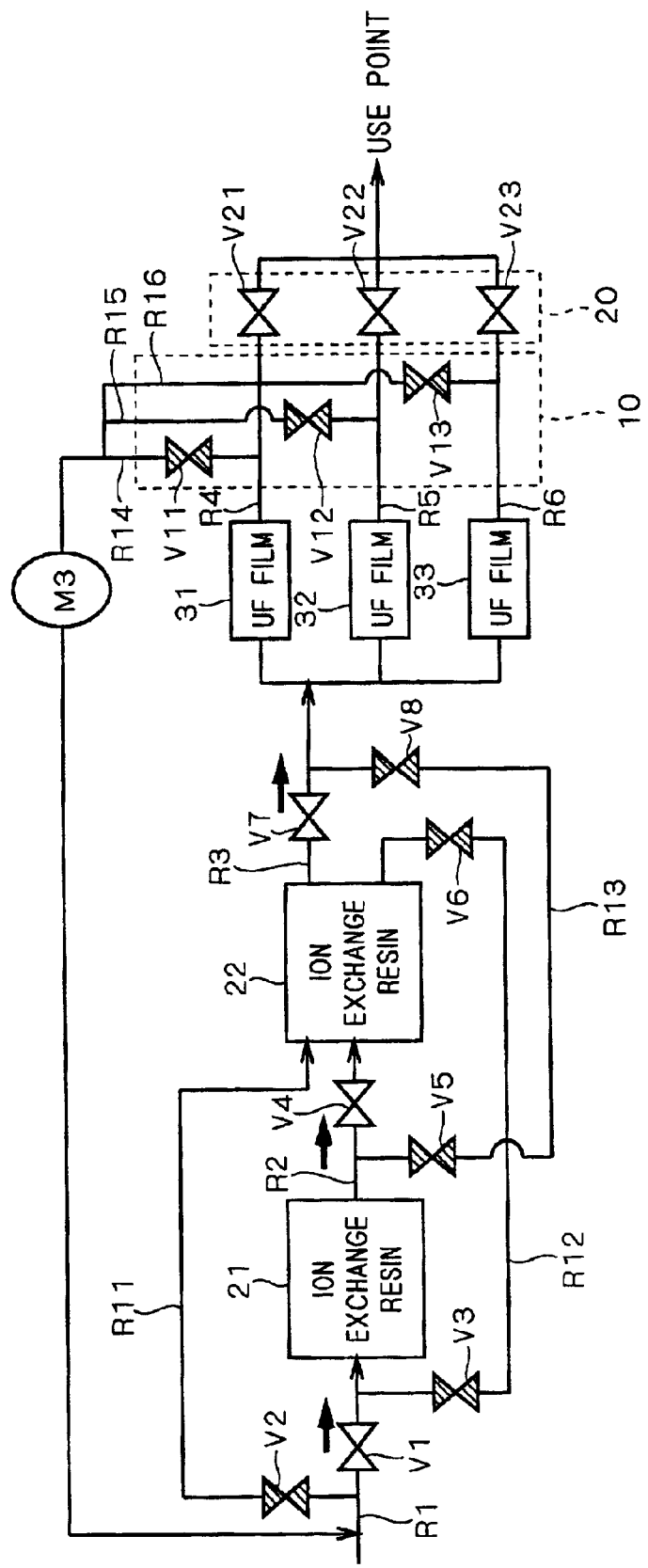
FIGS. 7 to 9 are block diagrams showing a structure of an ultrapure water producing apparatus according to a second embodiment of the present invention.

FIG. 7 shows a structure of the ultrapure water producing apparatus 200 according to the second embodiment.

In FIG. 7, an ion exchange resin 21 (CP21) and an ion exchange resin 22 (CP22) are provided in series in this order from the upstream side of the pure water supply route, and UF films 31, 32 and 33 are provided downstream of the CP22 in parallel.

A valve V1 is provided on a route R1 provided in the upstream of the CP21. A valve V4 is provided on a route R2 between the CPs 21 and 22. A valve V7 is provided on a route R3 between the CP22 and the UF films 31 to 33. Valves V21, 22 and 23 are connected to routes R4, R5 and R6 which are connected to the UF films 31, 32 and 33, respectively. The outlet sides of the valves V21 to V23 are commonly connected to a use point. The valves V21 to V23 are referred to as water-supply side valves 20.

There are further provided routes for bypass in addition to the above-mentioned routes R1 to R6 which form a pure water supply route (main route).

More specifically, there are provided: a bypass route R11 connecting an inlet of the valve V1 on the route R1 and that of the CP22; a bypass route R12 connecting an outlet of the valve V1 on the route R1 and that of the CP22; a bypass route R13 connecting an inlet of the valve V4 on the route R2 and an outlet of the valve V7 on the route R3; a bypass route R14 connecting the route R4 and the inlet of the valve V1 on the route R1; a bypass route R15 connecting the route R5 and the bypass route R14; and a bypass route R16 connecting the route R6 and the bypass route R14.

A valve V2 is provided on the bypass route R11. Provided on the bypass route R12 are a valve V3 at the side of the route R1 and a valve V6 at the side of the CP22. Provided on the bypass route R13 are a valve V5 at the side of the route R2 and a valve V8 at the side of the route R3.

Provided on the bypass route R14 are a valve V11 at the side of the route R4 and a metal concentration monitor M3 downstream of the valve V11. A valve V12 is provided on the bypass route R15, and a valve V13 is provided on the bypass route R16. The valves V11 to V13 are referred to as replacement valves 10.

Although an ultraviolet oxidation unit with low pressure mercury lamp (TOC-UV) is provided in the upstream of the route R1, illustration and explanation thereof are omitted because of its little relevancy to the present embodiment.

<B-2. Apparatus Operation>

Figure 8:
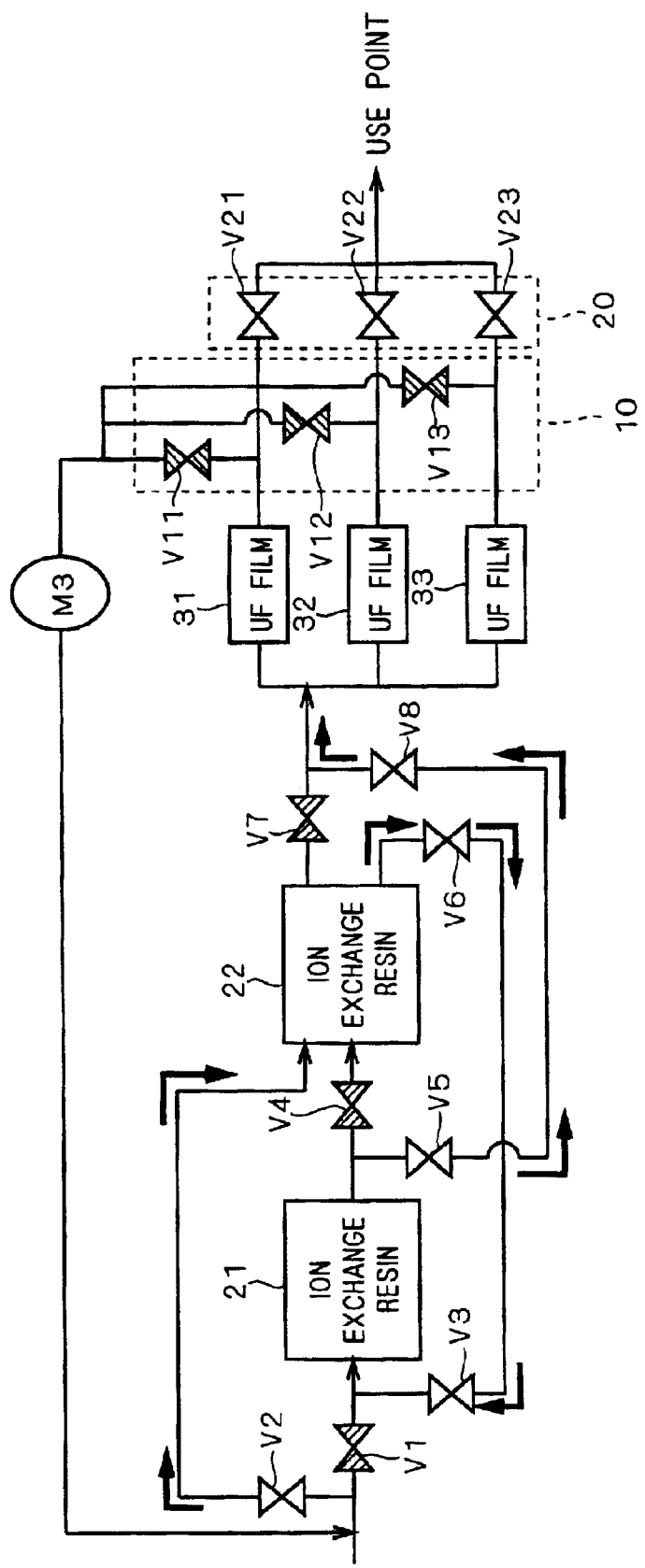
Figure 9:
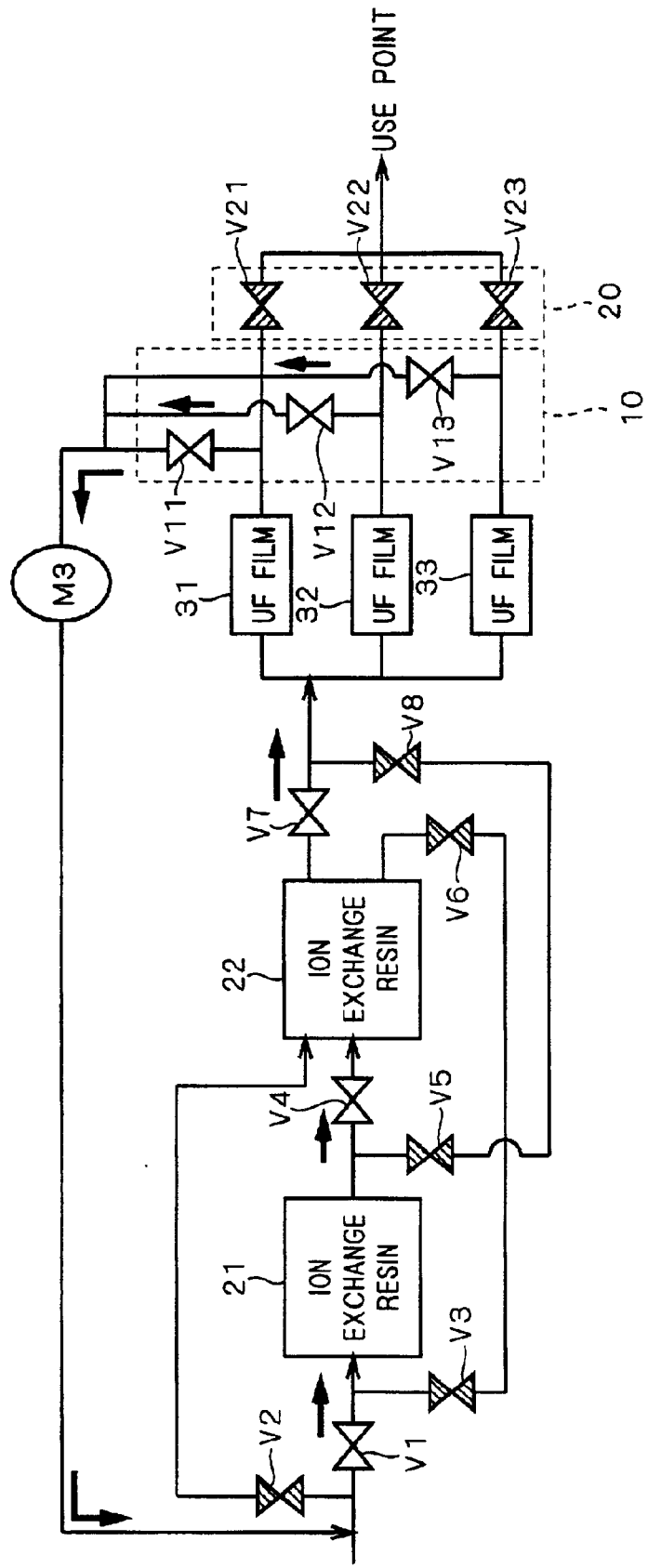

An operation of the ultrapure water producing apparatus 200 will be explained below referring to FIGS. 7 to 9. FIGS. 8 and 9 are basically equivalent to FIG. 7 except differences in the open/close state of the valves which are explicitly shown by the presence or absence of hatching.

An ion exchange resin (CP) is always replaced one by one. First, when the CP21 is replaced, the valves V1, V4 and V7 are opened as shown in FIG. 7 and the valves V2, V3, V5 and V6 are closed, so that pure water flows from the CP21 to the CP22 through R2 as indicated with arrows, which allows the metal component eluted from a brand-new CP21 to be removed in the CP22. This can prevent the metal component from being supplied to the use point through the UF films 31 to 33. At this time, the water-supply side valves 20 are all opened and the replacement valves 10 are all closed.

Valve operation is also carried out when replacing the CP22 next. The valves V2, V3, V5, V6 and V8 are opened and the valves V1, V4 and V7 are closed as shown in FIG. 8, so that pure water is first supplied to the CP22 through RI and the bypass route R11 and then supplied to the CP21 from the CP22 through the bypass route R12, and the metal component eluted from a brand-new CP22 is removed. Pure water is then supplied to the route R3 through the bypass route R13. This prevents the metal component from being supplied to the use point through the UF films 31 to 33. At this time, the water-supply side valves 20 are all closed and the replacement valves 10 are all opened as shown in FIG. 9.

In the case of replacing the UF films 31, 32 and 33, an eluted metal component cannot be removed since there is no CP on their back stages. Therefore, the water-supply side valves 20 are all closed and the replacement valves 10 are all opened as shown in FIG. 9, thereby causing pure water permeated through the UF films 31, 32 and 33 to return to the route R1 through the bypass route R14. At this time, the valves V1, V4 and V7 are opened and the valves V2, V3, V5, V6 and V8 are closed, which causes pure water to flow through the CPs 21 and 22 and the metal component eluted from the UF films 31, 32 and 33 to be removed.

Then, the metal concentration monitor M3 provided on the bypass route R14 continuously monitors the concentration of a metal component. At the stage where the concentration of the metal component is reduced to a predetermined concentration (threshold value), the replacement valves 10 are closed and the water-supply side valves 20 are all opened, thereby supplying pure water to the use point.

<B-3. Effect>

As has been described, in the pure water producing apparatus 200, the CPs 21 and 22 are connected in series and are replaced alternately, and during the elution of a metal component from a brand-new CP, its discharge is supplied to the remainder of CPs to remove the metal component. This can prevent pure water including the metal component resulting from the CP replacement from being supplied to the use point.

Further, when replacing the UF films 31, 32 and 33, until the concentration of a metal component eluted from a brand-new UF film reaches a predetermined concentration, its discharge is returned to the CP21 to remove the metal component.

This can prevent pure water including the metal component resulting from the UF film replacement from being supplied to the use point.

Although the above-described pure water producing apparatus 200 is shown with the CPs 21 and 22 connected in series, the number of CPs is not limited to two, but three or more CPs may be connected in series, or a plurality of pairs of parallelly-connected CPs may be provided in series.

Further, the number of UF films is not limited to three, but it may be only one, or four or more.

<C. Third Preferred Embodiment>

The above first and second embodiments have referred to detection of dissolved oxygen (DO) and detection of a metal component, however, a specific reference has not been made to a TOC meter for measuring total organic carbon (TOC).

Figure 10:
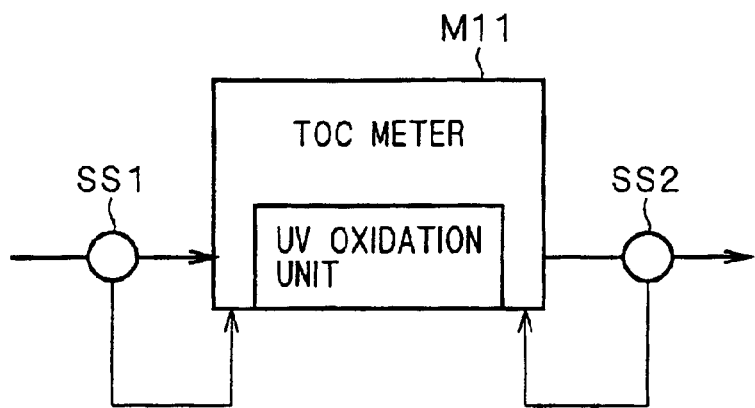
FIG. 10 shows a structure of a conventional TOC meter.

FIG. 10 shows a conventional structure for TOC detection. TOC detection has conventionally been carried out by means of a TOC meter M11 and resistivity sensors SS1 and SS2 connected to an inlet side and an outlet side of pure water of the TOC meter M11, respectively, as shown in FIG. 10.

More specifically, the TOC meter M11 radiates ultraviolet onto pure water at a UV oxidation unit provided therein to decompose an organic substance, a product of which serves to reduce the specific resistance of pure water. For instance, ultraviolet radiation causes an organic substance $C_xH_yO_z$ to be decomposed into $CO_2$ and $H_2O$. This $CO_2$ is dissolved in pure water to reduce the specific resistance. Then, the specific resistance of pure water is measured by the resistivity sensors SS1 and SS2 before and after flowing through the TOC meter M11. The TOC meter M11 calculates the rate of reduction on the basis of the measured result to quantify the amount of organic substances.

However, as described in the first embodiment, DO is also a target of control as an impurity to be reduced in pure water used in manufacturing a semiconductor device. Therefore, DO is reduced by vacuum degassing or the like prior to be supplied to the ultraviolet oxidation unit with low pressure mercury lamp (TOC-UV) shown in the first embodiment, so that the TOC meter M11 is forced to effect measurement with a low DO concentration.

As a result, there has been a problem in that an organic component has such a low rate of decomposition that a correct value cannot be detected. That is, as described above, taking the case of decomposing an organic substance $C_xH_yO_z$ into $CO_2$ and $H_2O$ as an example, an organic substance having a composition of Z<3X cannot be completely decomposed when DO in pure water is zero.

Figure 11:
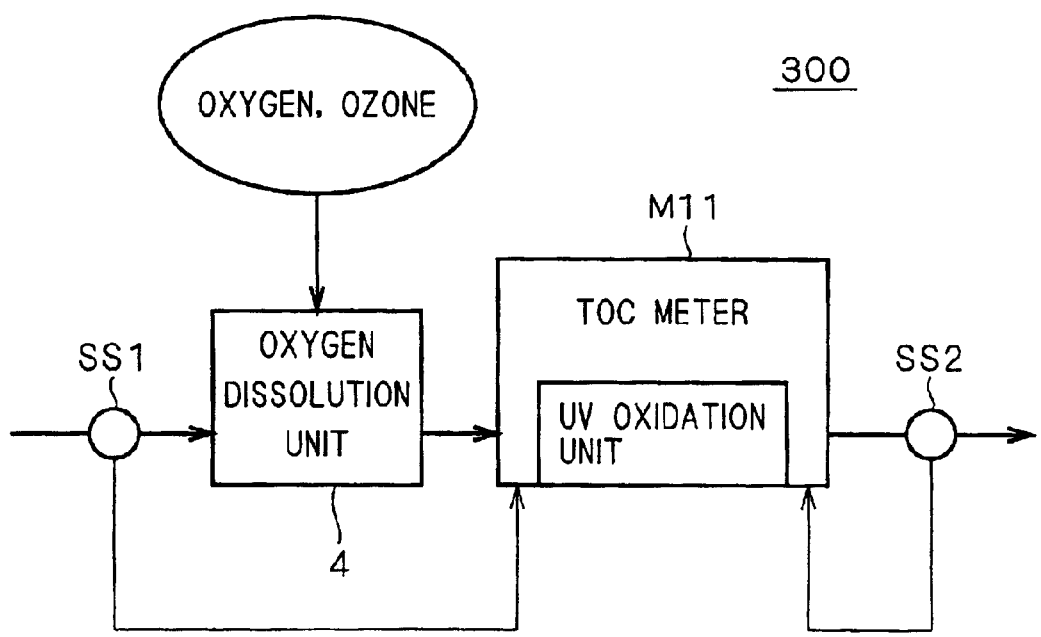
FIG. 11 is a block diagram showing a structure of the periphery of a TOC meter of an ultrapure water producing apparatus according to a third embodiment of the present invention.

FIG. 11 shows a partial structure of an ultrapure water producing apparatus 300 according to the present embodiment. The ultrapure water producing apparatus 300 has an oxygen dissolution unit 4 provided between the resistivity sensor SS1 and the TOC meter M11, thereby supplying oxygen or ozone necessary for decomposition of an organic substance (both not including an organic substance) before pure water to be measured is introduced into the TOC meter M11, allowing complete decomposition of an organic substance at the TOC meter M11. This makes it possible to obtain a correct TOC concentration.

Taking the ultrapure water producing apparatus 100 shown in FIG. 3 as an example, the TOC meter M11 is provided on the inlet side or the outlet side of the TOC-UV 1.

Figure 12:
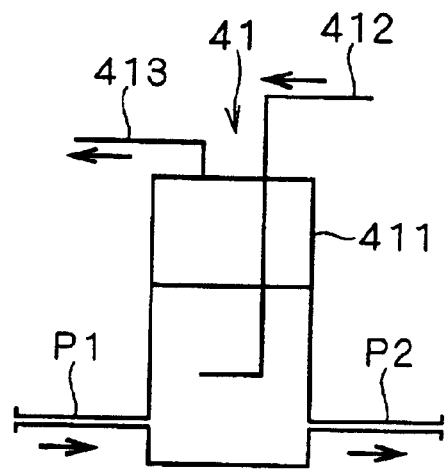
FIGS. 12 and 13 each show an example of an oxygen dissolution unit.
Figure 13:
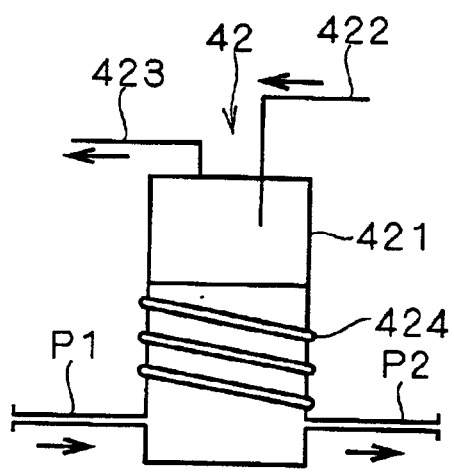

FIGS. 12 and 13 show exemplary structures of the oxygen dissolution unit 4. The oxygen dissolution unit 41 shown in FIG. 12 pressurizes and supplies oxygen gas or ozone gas to pure water in a pure water tank 411 (supplied through a piping P1 and discharged through a piping P2) through a gas line 412, and dissolves oxygen gas or ozone gas by bubbling. The remainder of gas that has not been dissolved is released to the outside of the pure water tank 411 through a degassing line 413.

An oxygen dissolution unit 42 shown in FIG. 13 supplies oxygen gas or ozone gas to a gas phase part (gas collecting part) in a pure water tank 421 through a gas line 422, while cooling pure water in the pure water tank 421 (supplied through a piping P1 and discharged through a piping P2) by a cooling system 424 provided in such a manner as to surround the pure water tank 421, thereby reducing the temperature of pure water to about 10° C., for example, to increase the solubility of gas. The cooling of pure water results in an increase in the solubility of gas, which allows oxygen gas or ozone gas to be satisfactorily dissolved without bubbling. The remainder of gas that has not been dissolved is released to the outside of the pure water tank 421 through a degassing line 423. As a matter of course, oxygen gas or ozone gas may be dissolved by bubbling upon cooling pure water.

<D. Fourth Preferred Embodiment>

The above third embodiment refers to the structure in which an organic substance is decomposed by ultraviolet radiation at the TOC meter M11 and the specific resistance of pure water is reduced by $CO_2$ generated by the decomposition, thereby detecting total organic carbon (TOC). Utilizing the characteristic of $CO_2$ that reduces the specific resistance of pure water, an effect can be exerted as will be described below.

Figure 14:
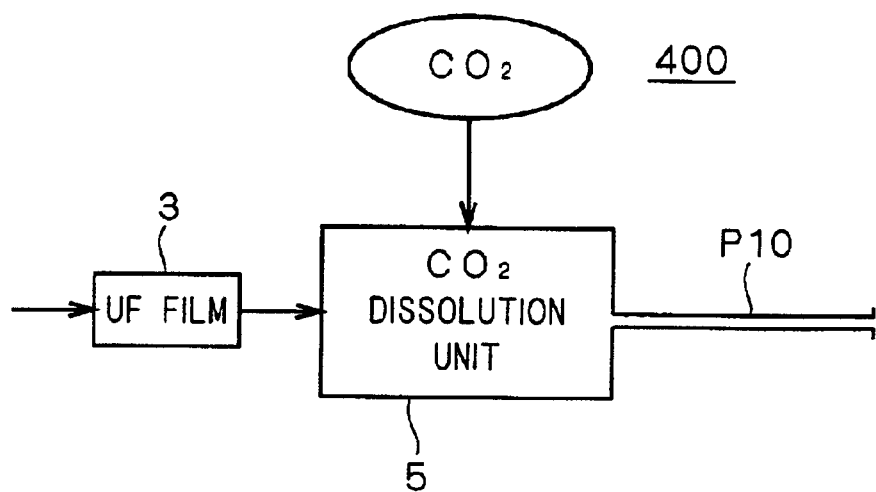
FIG. 14 is a block diagram showing a structure of the neighborhood of a use point of an ultrapure water producing apparatus according to a fourth embodiment of the present invention.

FIG. 14 shows a partial structure of an ultrapure water producing apparatus 400 according to the present embodiment. The ultrapure water producing apparatus 400 includes: a $CO_2$ dissolution unit 5 for dissolving $CO_2$ in pure water which is provided at a position close to the use point downstream of the UF film (ultrafiltration film) 3; and a conductive piping P10 connecting an outlet of pure water of the $CO_2$ dissolution unit 5 and the use point.

Conventionally, an insulative piping made of vinyl chloride, polypropylene, polyvinylidene chloride (PVDF) or the like has been used for the above piping.

$CO_2$ dissolved in pure water is converted into an ion such as $HCO_3^-$, which results in a reduction of the specific resistance. This makes the electrical conductivity of pure water good, while preventing the conductive piping P10 from being charged since the piping is provided downstream of the $CO_2$ dissolution unit 5. As a result, this prevents electrically charged particulates from being electrostatically adsorbed on the piping and gathering to form a particle, and prevents sudden desorption of this particle due to variations in pressure or variations in the amount of flow. Therefore, it is possible to reduce particles in pure water.

As a material for the conductive piping P10, a mixture of an insulation material such as vinyl chloride and a conductive additive such as carbon black may be used, as an example.

Figure 15:
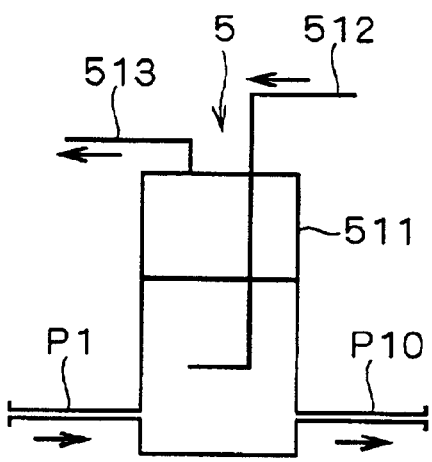
FIG. 15 shows an example of a carbon dioxide dissolution unit.

FIG. 15 shows an exemplary structure of the $CO_2$ dissolution unit 5. The $CO_2$ dissolution unit 5 shown in FIG. 15 has a structure for pressurizing and supplying $CO_2$ gas to pure water in a pure water tank 511 (supplied through a piping P1 and discharged through a piping P2) through a gas line 512, and dissolves $CO_2$ gas by bubbling. The remainder of gas that has not been dissolved is released to the outside of the pure water tank 511 through a degassing line 513.

While the invention has been shown and described in detail, the foregoing description is in all aspects illustrative and not restrictive. It is therefore understood that numerous modifications and variations can be devised without departing from the scope of the invention.

What is claimed is:

1. An ultrapure water producing apparatus comprising:
    at least two ion exchangers each configured to purify pure water;
    a main route connecting said at least two ion exchangers in series; and
    a plurality of bypass routes connected to said main route and connecting said at least two ion exchangers in series such that the pure water flows through the at least two ion exchangers in an order different from the order of said at least two ion exchangers connected by said main route.

2. The ultrapure water producing apparatus according to claim 1, wherein:
    said at least two ion exchangers at least include a first ion exchanger provided on a most downstream side in which pure water flows and a second ion exchanger;
    said plurality of bypass routes at least include a first bypass route, a second bypass route and a third bypass route;
    said first bypass route is configured to supply first processed pure water to said second ion exchanger when said first ion exchanger is discharging said first processed pure water;

said second bypass route is configured to send second processed pure water to said main route when said second ion exchanger supplied with said first processed pure water is discharging said second processed pure water; and said third bypass route is configured to supply pure water to said at least two ion exchangers except an ion exchanger provided on a most upstream side in which pure water flows.

3. The ultrapure water producing apparatus according to claim 2, further comprising:

an ultrafiltration film provided downstream of said at least two ion exchangers;

a fourth bypass route for supplying permeate pure water discharged from said ultrafiltration film to said at least two ion exchangers; and a metal concentration meter for detecting a metal component of said permeate pure water flowing through said fourth bypass route.

4. The ultrapure water producing apparatus according to claim 2, wherein:

said main route includes a plurality of main route valves provided for interrupting supply of pure water to said at least two ion exchangers, said plurality of main route valves being provided corresponding to said at least two ion exchangers; and said plurality of main route valves are configured to close when flowing pure water through said first to third bypass routes.

* * * * *